May 2, 1939.  C. A. McDOWELL ET AL  2,156,432
AUTOMOBILE ACCESSORY
Filed Jan. 18, 1938  2 Sheets-Sheet 1

INVENTORS
CHARLES A. McDOWELL AND
BY LABANNA J. SMITH
Edward R. Inman
ATTORNEY

May 2, 1939.  C. A. McDOWELL ET AL  2,156,432
AUTOMOBILE ACCESSORY
Filed Jan. 18, 1938  2 Sheets-Sheet 2
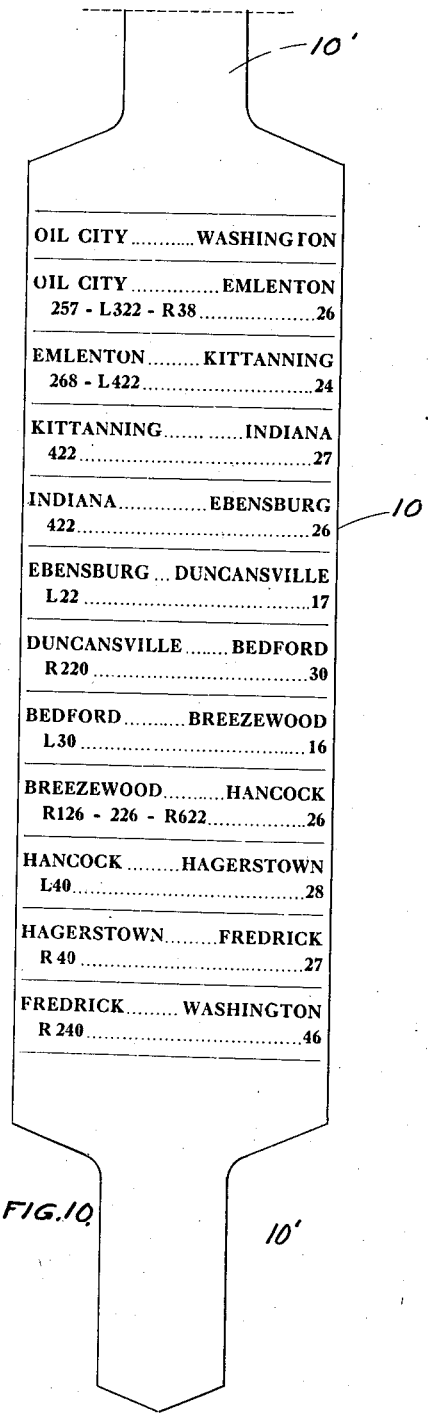
FIG.10
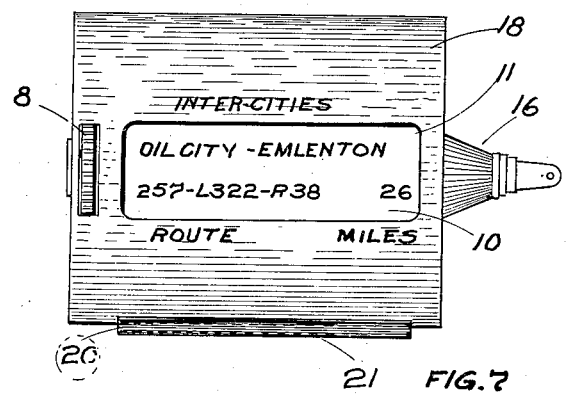
FIG.7
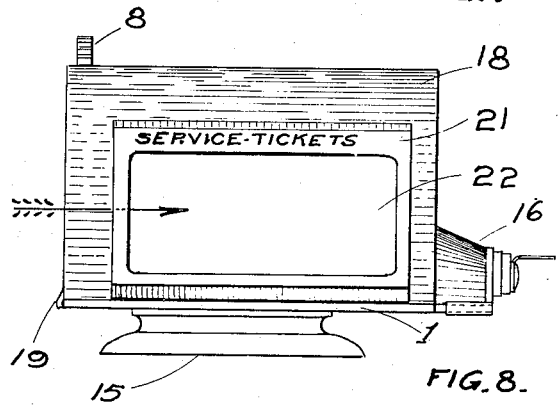
FIG.8
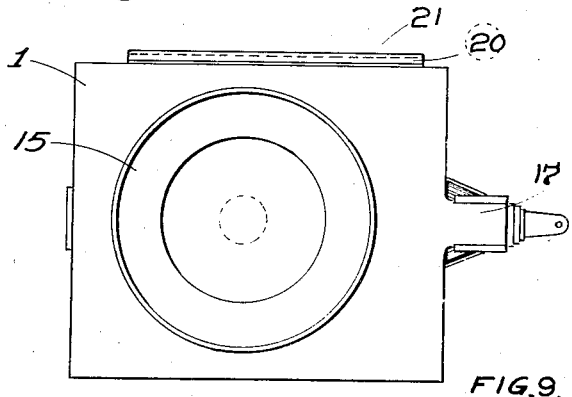
FIG.9
INVENTOR
CHARLES A. McDOWELL &
BY LABANNA J. SMITH
ATTORNEY Patented May 2, 1939

2,156,432

UNITED STATES PATENT OFFICE 2,156,432

AUTOMOBILE ACCESSORY

Charles A. McDowell and Labanna J. Smith,
Oil City, Pa.

Application January 18, 1938, Serial No. 185,505

4 Claims. (Cl. 40—95)

This invention relates to an automobile accessory consisting of a case for the display of a route-log together with a compartment or chink for the reception and preservation of service tickets.

The route-log is so carried and mounted within the case that it may be manipulatively actuated to progressively indicate the route to be traveled to a desired destination, together with the intermediate distances between cities through which the route leads.

The service-ticket feature is adapted for the reception of service tickets relating to the various items of service which are rendered by service stations to their patrons; said tickets having noted thereon the items of service rendered, together with the date of rendition, and the note of a contingency which will indicate the need of the repetition of certain of the items of service.

These service tickets should be preserved by the owner of the automobile receiving the service, as an aid to keeping the automobile in proper condition, and furthermore, to aid inspectors in determining whether the automobile is being properly maintained.

The construction of our improved accessory is clearly illustrated in the accompanying drawings and described in the annexed specification, along with the method of use and the disposition of the case for convenient access to and actuation of the log.

Referring to the drawings.

Figure 1:
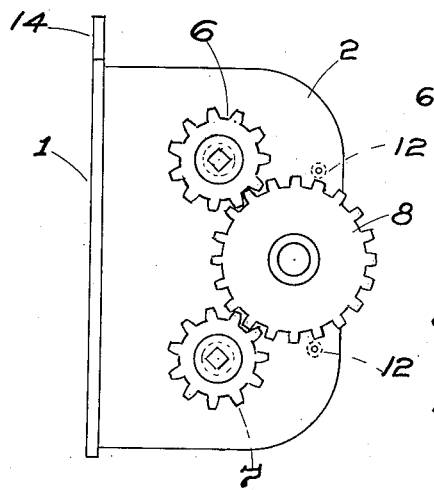
Fig. 1 is an end elevation of the main frame and the operative details carried thereby, with the outer casing or cover removed.

In all these views the log is not shown.

Fig. 7 is a plan view of the complete case with a portion of the log exposed to view through the window.

Fig. 8 is an elevation of the adjacent side of Fig. 7 in which the service ticket file is clearly shown.

Fig. 9 is an inverted plan view of the case shown in Fig. 8.

Fig. 10 is a face view of a log.

The construction illustrated in said drawings is substantially as follows:

The case comprises a base 1 to which is attached end portions 2 and 3; said end portions being perpendicular to said base and rigidly secured thereto; there are two log-actuating rollers 4 and 5 revolubly carried by, and extending intermediate, said sides; one projecting end of each of said rollers 4 and 5 is provided with an operating pinion 6 and 7, respectively, said pinions being of the spur type. Upon the adjacent other face of the side, upon which said pinions are positioned, is revolubly mounted a spur gear 8 which is arranged in mesh with both of said pinions; said gear 8 is adapted to serve as the actuating element of said pinions and their respective rollers 4 and 5, and because of this latter function, said gear is termed a thumb-gear.

Each of said rollers is provided with a longitudinally-extending slot 9 through which one of the tongues 10, 10 of the log Fig. 10 is threaded respectively, so as to be removably attached thereto; in order to so thread the log into the rollers, one tongue thereof is first inserted through the slot of one of the rollers: the log is then wound upon the threaded roller; then the other end of the log is threaded into the other roller and may be so wound thereupon; when thus arranged in relation to said actuating rollers, the log may be caused to travel in either direction at will, and is readily removable, for the substitution of another log. Owing to the fact that there is usually a small degree of slack in the log, a certain amount of back-lash is intentionally provided between the intermeshing teeth of the gear and pinions, the resulting difference in diameter of the rolls as the log travels between them, and winds upon and unwinds therefrom respectively, makes it possible and wholly feasible to employ the driving arrangement shown, and which is considered one of the novel features of our invention, especially because of its simplicity.

In order to position the informative portion of the log into close legible registry with the window 11, two guide rollers 12, 12 are employed, over which the log passes. As previously stated, the gear 8 serves as a thumb wheel for the actuation of the rollers 4 and 5.

In order to increase the legibility of the log, a small electric lamp 13 is provided beneath the log and directly below the window, 11; because of this, it will be readily understood that legibility will be further increased if the log is printed upon translucent material so as to permit a portion of the rays of light from the lamp 13 to pass therethrough.

Figure 2:
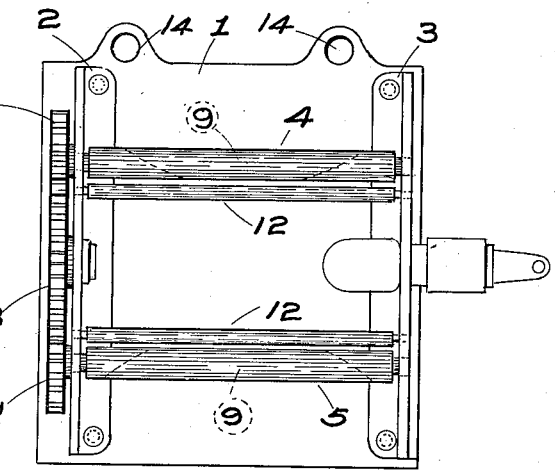
Fig. 2 is a plan view of Fig. 1.
Figure 3:
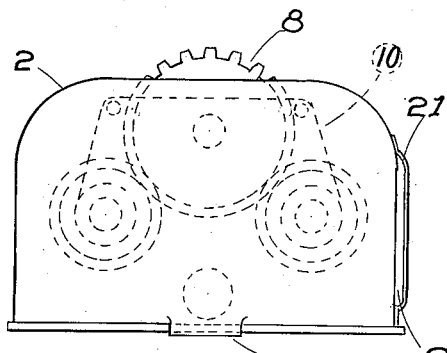
Fig. 3 is an end view with the outer casing in position.
Figure 4:
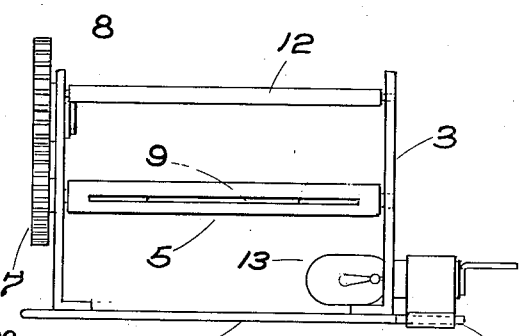
Fig. 4 is an elevation of the lower and adjacent end of Fig. 2.
Figure 5:
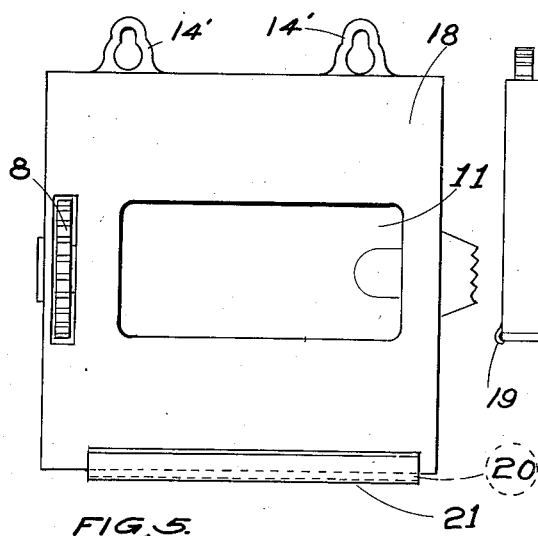
Fig. 5 is a plan view of the complete case.

Any suitable provision may be made in the way of equipping the case with positioning means whereby to attach the case in proximity to the driver's seat and affixing same thereat in a stable manner; as an illustration of such means, we have shown in Figs. 2 and 5 eye-extensions 14 and 14' on the base for the reception of screws, for the engagement of hooks, or other devices of like nature. In addition to such means, there is shown in Figs. 8 and 9 a vacuum cup 15. Inasmuch as all the operative strain due to the actuation of the log by means of the thumb-wheel-gear 8 is at one end of the case, said cup is shown as being placed near to said end, whereby stability of attachment is attained.

There are several points and positions within an automobile and in proximity to the driver's seat where there are smooth surfaces suitable for the stable attachment of the case by means of said vacuum cup; such stability is not only conducive to greater ease of reading the log, but it also is conducive to a more reliable and durable electrical wiring connection for the lamp 13.

The lamp 13 is provided with a mounting 16 which is removably attached to the tongue 17 of the base 1 for the purpose of lamp renewals, when necessary; any suitable electrical connection for this lamp may be employed.

The cover 18 is removably attached to the base 1 in any suitable manner, as by spring catches 19 shown in Figs. 3, 5, 6, 7, and 8.

The window, 11, is closed by means of any of the transparent materials now in common use for glazing purposes.

Because of the increase of automobile accidents upon highways, highway patrols nearly everywhere are becoming more and more strict in the inspection of automobiles to ascertain whether they are properly maintained, especially in respect to such details as crank-case lubrication, transmission lubrication, differential lubrication, condition of brake mechanism, condition of battery, lubrication of front wheels, etc., and nearly all service stations supply a service ticket, with each item of service rendered, noted thereon, together with a note indicating a contingency, or condition denoting the need of a repetition of one or more of the items of service.

Many operators of cars, owing to a lack of a suitable convenient place to keep these tickets, throw them away, whereas, as a guide to the proper care of an automobile, they should be preserved for such period as the noted service may safely cover, and especially so because they are useful as relevant evidence in fixing responsibility in the case of accidents where damage is caused to other cars or injury to their passengers.

Figure 6:
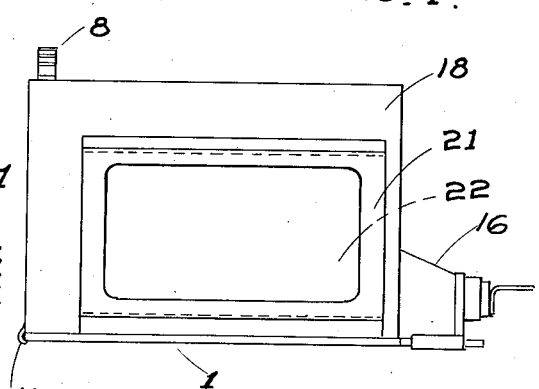
Fig. 6 is a side view of the lower side of Fig. 5.

For the purpose of supplying a suitable place for the reception of these service tickets, a chink 20 is formed upon one side of the case, into which tickets may be inserted as indicated by the arrow in Fig. 6. Said chink is an area in the form of an oblong, rectangle formed upon one of the sides of said case, said area being defined by having upon three sides thereof ticket-engaging features projecting over the adjacent edges of said area and spaced therefrom to form ticket-receiving grooves; the fourth side of said area being open and clear for the insertion of service tickets thereinto.

As an illustration of the cooperative use of the route log and the service ticket feature of this invention, let it be assumed that the owner of the automobile wishes to take a long trip and wishes to know, what, if any, service should be rendered before the end of the trip is reached and that the car is equipped with the present route log, relating to the prospective trip.

The log will indicate in miles, the length of the contemplated trip; the service ticket will indicate the number of miles that can be traveled since a subsisting service in question, was rendered; the speedometer of the car indicates the distance which has already been traveled since said service in question was rendered, and if the length of the contemplated trip is less than said remaining service distance, the owner will know that renewal of this service will not be required during the trip. If however the length of the contemplated trip is greater than said remaining service distance, the car operator may consult the log and calculating from the distances indicated thereon, determine at what point along the route, the contemplated service will be exhausted and must be renewed.

We claim the following:

1. In combination with a strip map advancing means, a lamp, a casing adapted to receive said means, said casing having downwardly extending side and end members and a top member, one of said end members having a housing extending therefrom, said housing adapted to overlay and conceal the base of said lamp, said top member having therein an elongated window opening extending parallel, adjacent to and substantially the width of one edge of said top member, said casing also having a card pocket consisting of struck-out tabs, said tabs being struck outwardly around and so as to form the three sides of said card pocket, the fourth side of said pocket being open for the reception of an advertising card.

2. In an automobile accessory in combination, a strip map advancing means and a service-ticket filing means, a lamp, a base for said means, said base having upon one edge thereof a laterally-projecting tongue, a socket for said lamp carried by said tongue, a casing adapted to receive said means and said lamp, said casing being a unitary structure comprising downward, extending end and side members and a top member one of said end members having a housing adapted to overlay and conceal said lamp, said top member having therein an elongated window opening extending parallel, adjacent to, and being substantially the width of said top member, one of said members having an area provided upon three sides thereof with filing means for said service ticket the fourth side of said area being free and adapted for the insertion of a service ticket into said filing area, with the informative matter relating to the instant automobile thereon, exposed to view.

3. In combination a strip-map advancing means, together with service ticket filing means, a base for said means, said base having upon one edge thereof a laterally projecting tongue, a lamp socket carried by said tongue, a lamp in said socket and projecting inwardly therefrom, a casing adapted to receive said means and said lamp, said casing being a unitary structure consisting of downwardly-extending end and side members and a top member, one of said end members having extending laterally therefrom a housing adapted to overlay said tongue, socket and the adjacent portion of said lamp, said top member having therein an elongated window opening, extending parallel, adjacent to and being substantially the width of said member, said casing also having an area adapted as a card pocket formed by members overlying three edges of said area, the fourth edge of said area being clear for the insertion of service tickets into said pocket, beneath said overlying edges.

4. In an automobile accessory in combination, a strip map advancing means and service-ticket carrying and exhibiting means, comprising among the component elements, a base having upon one edge thereof a laterally projecting tongue, a lamp socket carried by said tongue, a lamp in said socket projecting inwardly therefrom, a casing adapted to receive said strip map, its advancing means and the bulb of said lamp, said casing having downwardly extending side and end members and a top member, one of said downwardly-extending members having a housing extending therefrom, adapted to overlay and shield said socket and the base of said lamp, said top member having therein an elongated, transversely-extending window opening, one of said other members having an area thereof adapted to act as a card pocket, said pocket being formed by edge features positioned upon three sides of said area, extending over, and spaced outwardly from the face of said area, the third side of said area being plain and open for the reception thereinto and exposure of the face of a service ticket, which bears upon said face notes relating to service items rendered, subsisting and to be rendered, also the designation of a contingency indicating the need of repetition of certain of said items to be rendered.

CHARLES A. McDOWELL.
LABANNA J. SMITH.